Feb. 27, 1968    R. A. SANDERSON ET AL    3,371,350
INK SUPPLY SYSTEM WITH PRESSURE REGULATING DIAPHRAGM
Filed Sept. 9, 1966
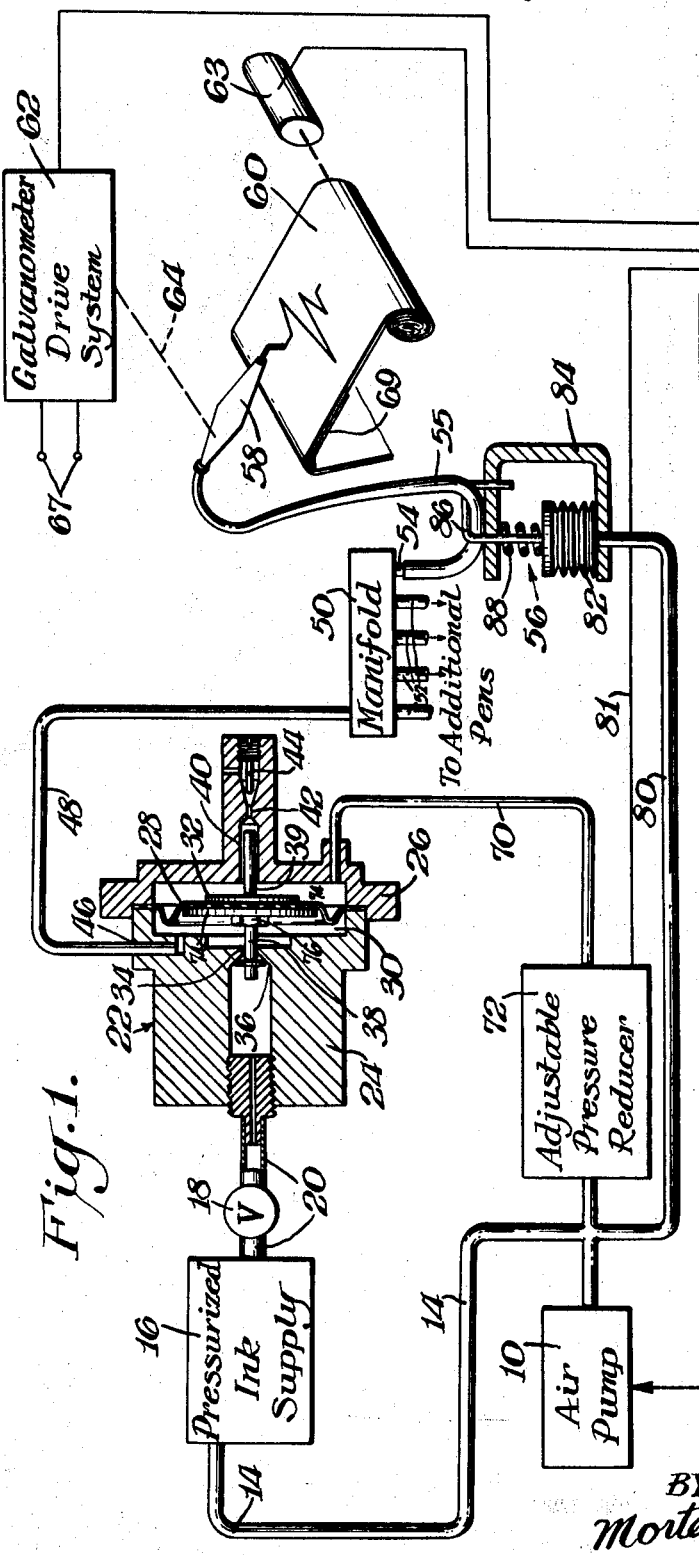
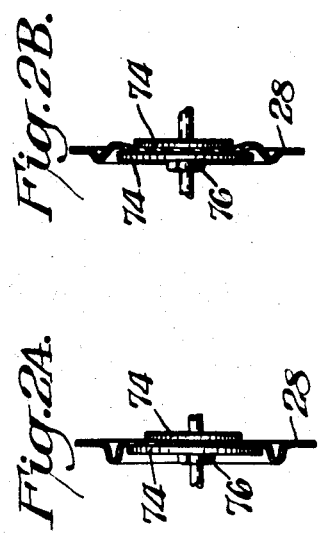
INVENTORS
Robert A. Sanderson
Robert G. Graves
BY
Mortenson and Weigel
ATTORNEYS

United States Patent Office 3,371,350
Patented Feb. 27, 1968

3,371,350
INK SUPPLY SYSTEM WITH PRESSURE
REGULATING DIAPHRAGM
Robert A. Sanderson, Wayland, and Robert G. Graves,
Marblehead, Mass., assignors to Hewlett-Packard Company, Palo Alto, Calif., a corporation of California
Filed Sept. 9, 1966, Ser. No. 578,213
11 Claims. (Cl. 346—140)

ABSTRACT OF THE DISCLOSURE

The ink pressure supplied to an oscillographic type recorder is regulated by the use of a pressure regulating diaphragm having a stiffener plate. The pressure regulating diaphragm is positioned in a housing to form two chambers—one being connected to a source of air pressure and the second communicating through a valve controlled by the diaphragm position to a pressurized ink supply. In this manner, when the air pressure exceeds the ink pressure in the second diaphragm chamber, the valve opens to admit the ink. The stiffener plate functions when the air pressure is reduced to relieve the ink pressure throughout the system by distending the diaphragm slightly.

---

This invention relates to an ink supply system for graphic recorders and, more particularly, to an improved inking system for use with high speed oscillographic recorders, which system reduces skipping and flooding of the ink pen on the chart paper and facilitates replacement of the ink supply.

Some of the early graphic recorders used inking systems which were dependent upon either gravity or capillary action to supply ink from a reservoir to the nib of an ink pen. While satisfactory for low-speed pen movements, such systems have been entirely unsatisfactory with the newer high speed oscillographic type recorders where signals having rise times in the millisecond range are recorded. When a pen is driven by these higher frequency signals, not only its velocity but also its acceleration is considerable. With such high velocity and acceleration the pen tends to skip, producing blanks or discontinuities in the ink trace. In addition, the width of the ink trace tends to vary inversely with pen speed relative to the chart paper. Such width variations are undesirable to say the least.

These effects can be overcome to some extent by using a higher static ink pressure, but unfortunately when signals having a lower rise time or frequency are recorded and/or the chart run at proportionally lower speeds, the pen tip tends to flood, literally causing puddles of ink on the chart paper and width variations of ink trace are still present to some extent.

Another problem encountered in existing systems resides in the necessity for coping with the requirement of refilling or replacing the ink supply. Many existing ink recorders require that the whole recording operation be terminated while the ink reservoir is being refilled. In this latter event valuable information may well be lost while the refilling takes place. Another desirable feature for ink recorders, particularly those of the multi-channel variety, is that the ink be prevented from flowing back into the pen tip or syphoning between the several pens of a multipen system when the system is shut down. Such backflow or syphoning allows air to enter the ink lines which causes start up delays, and in some cases may cause blockage when the pen is subsequently used. It is also desirable that the recorder, when initially started up, be free from drops of ink formed on the pen tip which could otherwise dry and form a crust or make an ink blotch on the chart paper.

One system that has been employed to overcome many of these disadvantages is that described in Reissue Patent No. 25,692, issued to A. D. Brown, Jr., on Dec. 1, 1964. The Brown patent teaches the use of a highly viscous ink under a substantially constant static ink pressure to prevent skipping and flooding of the ink pen on the paper. Unfortunately in this system, the ink pen nib or writing tip must be pressed against the chart paper with a greater force than is usual, and a high degree of accuracy is required to maintain perpendicularity in order to prevent leakage between the pen tip and paper. This increased pressure increases the friction between the pen tip and the chart paper and coupled with the higher strength required to maintain perpendicularity, not only reduces the lifetime of the pen tip but also slows the pen response time and increases the overall hysteresis and inertia. Higher driving power is required to obtain an acceptable response time. This makes for a more expensive system.

It is therefore an object of this invention to obviate many of the disadvantages of the prior art ink recorders.

Another object of this invention is to provide an improved pressurized ink supply for an ink recorder which supply can be replaced or refilled without stopping the recorder.

An additional object of this invention is to provide an improved pressurized ink supply which supply incorporates an improved ink pressure regulator for relieving the system ink pressure on shut down.

An additional object of this invention is to provide an improved pressurized ink supply for an ink recorder which supply incorporates an auxiliary supply of ink to permit the operation of the recorder for a limited period of time even after exhaustion of the ink reservoir.

A further object of this invention is to provide an improved pressurized multiple pen ink supply for an ink recorder which prevents backflow of the ink into any pen tip when the system ink pressure is reduced.

In a preferred form of the invention, the ink supply for a graphic recorder incorporates an ink reservoir for storing ink at a predetermined pressure, a source of air rpessure, a diaphragm housing, and a flexible diaphragm supported by the housing and defining first and second chambers in the housing. The housing includes a channel or conduit between the first chamber and the pen or pens and between the second chamber and the source of air pressure. A valve seat member is formed in the housing so as to have a conduit through the valve seat and the ink reservoir is connected to the first chamber through the valve seat conduit. A valve member, supported by the diaphragm, passes through the valve seat member for the purpose of controlling the passage of ink from the reservoir to the first chamber in accordance with movement of the diaphragm. With this arrangement, ink flows from the reservoir into the first chamber whenever the air pressure in the second chamber exceeds the ink pressure.

A stiffener plate is attached to the diaphragm and located in the first chamber. In this manner when the ink pressure is less than the air pressure, the valve opens to admit additional ink until the pressure is again equalized and the valve closes. The stiffener plate may have apertures therein which operate to advantage when the air pressure is reduced. The stored ink pressure in the system is then free to expand into the first chamber and any excess pressure can be relieved by the membrane bulging slightly.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

FIGURE 1 is a partial sectional view and partial schematic flow diagram of an ink supply system for a graphic recorder constructed in accordance with a preferred embodiment of this invention; and FIGURES 2a and b are cross-sectional views of the stiffener plate in each of its two operating positions when employed in the system illustrated in FIG. 1.

An ink system constructed in accordance with this invention may be seen with particular reference in FIG. 1 wherein there is shown a source of fluid pressure such as an air pump 10, which may be controlled by a central control unit denoted by the block 12. The air pump 10 may be no more than a regulated compressor type pump driven by an electric motor of conventional type. The air pump 10 supplies air, for fluid pressure, through a tube or conduit 14 to a pressurized ink reservoir or supply 16; the ink supply 16 is contained typically in a can. The ink within the can may be maintained under pressure by a self-contained gas therein or the pressure may be established or maintained by the pump 10 as illustrated. Alternatively, a spring loaded piston may maintain the desired pressure in the ink supply 16. If a gas pressurized can is used, the ink either should be in the bottom thereof or the can should have an internal diaphragm separating the gas from the ink so that it will dispense all of the ink out of the can independently of the position of the can. A typical ink can of this type is described in U.S. Patent No. 3,185,991, issued May 25, 1965, to Gill. Gill describes a form of ink reservoir which includes a compressible resilient ink storage chamber. The Gill chamber is constructed in the form of a bellows and a weight mounted on the bellows maintains the constant desired hydrostatic head on the contents.

Still another form of ink supply 16 which may be employed is described in pending application, S.N. 541,913, filed Apr. 7, 1966, by Steven K. Peredy. As described by Peredy, a pressurized container encloses the ink within a resilient, flexible bag. The space between the bag and the container wall is pressurized as by the air pump 10. In one embodiment of the Peredy invention, the bag is enclosed within a bottle whose cap has a septum. A hollow needle is adapted to pierce the septum to withdraw the ink and permit the removal of the ink bottle for replacement.

A spring loaded, normally-closed valve 18 of conventional design, adapted to be opened when the ink supply 16 is coupled to the valve 18, is disposed in a tube or conduit 20 which connects the pressurized ink supply 16 and a regulator (shown here in cross section). So long as the ink supply 16 is connected to the valve 20, the valve is maintained in an open position. If the ink supply 16 is removed, the spring loaded valve 18 closes. Peredy described a valve of this type.

The regulator includes a housing 22 which is formed of two cup-shaped, molded parts 24 and 26, respectively. When the two molded parts 24 and 26 are joined together they are adapted to clamp therebetween a disc-shaped, flexible diaphragm 28 which may be formed typically of a sheet of rubberized fabric. The housing may be suitable molded plastic. One suitable plastic is known under the trademark "Lexan" and is available from General Electric Company. Thus disposed, the diaphragm 28 defines first and second chambers 30 and 32, respectively, within the housing. The housing 22 is generally cylindrical in shape and the first part 24 is formed to have an axial conduit or bore 34 therein communicating with a valve seat 36. A valve member 38 is attached and adapted to move with the diaphragm 28, axially with respect to the housing 22, to seat against the valve seat 36.

The valve member 38 includes rod 39 which extends through the diaphragm 28 and a second axial bore 40 in the second part 26 up to a point immediately adjacent a restricted portion 42 within the bore 40. A pointed set screw 44 is inserted threadly into the end of bore 40 and is adjustable by screwing so as to restrict to a greater or lesser degree the flow of fluid or air through the conduit 40 to a radial escape passage or conduit 46 which may be molded or bored within the part 26 when it is constructed.

Ink is thus permitted to flow from the supply 16 through the valve 18 and conduit 20 to the first chamber 30 and from there through a radially disposed conduit or passage 46 and a tube or conduit 48 to an ink manifold 50 which has plurality of outlet conduits 52. The manifold 50 may be nothing more than a hollow cylindrical metal or plastic tube having a plurality of outlet tubes or conduits inserted therein. One of these outlet conduits 52, namely conduit 54, is connected through a clamp member 56 to a pen 58. The pen 58 is adapted to be driven with respect to a piece of chart paper 60, or other suitable recording medium, by a suitable galvanometer drive system 62 of well-known type, operating through either a curvilinear or rectilinear linkage 64 (denoted by the dotted line). The galvanometer drive system 62 is adapted to receive input signals to be recorded from a pair of input terminals 64 and is controlled by the control unit 12 in a conventional manner. A motor 63, also controlled by the unit 12, draws the chart paper 60 across a platen 63 in a known manner.

Returning now to the diaphragm housing 22, the second chamber 32 is coupled by way of a second radial passageway or conduit 70 and an adjustable pressure reducer 72 to the air pump 10. The function of the pressure reducer 72 is to permit the selection of the desired air pressure, which may be greater for the higher paper speeds and lower for the lower paper speeds. This may be controlled by the control unit 12 through the line 81 which actuates the appropriate solenoid valves in reducer 72. The several tubing or conduits employed may be, in each instance, natural rubber, latex tubing which may be easily stretched and fitted over the nipples or outlets extending from the several parts. Other suitable plastic or otherwise tubing may be employed as desired.

In a preferred embodiment of the invention, a pair of disc-shaped stiffener plates 74 of different diameters are secured as by nuts 76 to be flush against the disc-shaped diaphragm 28. The stiffener plates 74 may be formed, for example, out of stainless steel and may have a plurality of apertures therein, the function of which will be described hereinafter.

The air pressure from the air pump 10 is also connected via a conduit 80 to a bellows actuated clamp valve 56. The valve 56 includes a bellows 82 disposed within a U-shaped clamp or bracket 84 and, under the influence of air pressure from the pump 10, expands and drives a J-shaped hook member 86 upwardly in the drawing so as to open the flexible tubing 55 connecting the pen 58 and the manifold 50. In the absence of air pressure, the bellows 82 collapses under the influence of a compression spring 88 thereby squeezing or clamping off and closing the tubing 55. A separate clamp valve 56 is employed for each ink line 52 from the manifold 50, all being actuated by air or other pressurized fluid through conduit 80.

Using the system shown in FIGS. 1 and 2 many advantages accrue. In the first instance, by the use of the novel housing 22, a highly constant ink pressure throughout the system is maintained merely by adjusting the pressure reducer 72. The reducer 72 establishes the desired pressures by suitable bleed valves of well-known types. The air or other fluid pressure is directed through conduit 70 to the second chamber 32 and tends to force the diaphragm 28 leftward in the drawing thereby increasing the pressure of ink in the second chamber 30. This ink under pressure, passes through the tubing 48 to manifold 50 and thence through the bellows valve 56 to the pen 58.

As the ink is used up on the chart paper, the volume of ink in the first chamber 30 of the housing 22 decreases. This permits the diaphragm 28 to move toward the left in the drawing and eventually the valve member 38 unseats from the valve seat 36 thereby permitting a pulse of the high pressure ink from the ink supply 16, in effect, to pulse or surge momentarily into the first chamber 30. The valve member 38 again seats and the first chamber 30 is again sealed, its pressure being maintained by that of the air pressure, from the reducer 72 acting against the area of the diaphragm 28. This action of the ink pulsing into the chamber is recurrent and repetitive until such time as the supply of ink is used up. At this point in time, the valve member 38 leaves the valve seat 36 to permit ink to enter into the first chamber 30. But no additional ink can enter the first chamber, hence the diaphragm continues its leftward movement until the limit of its movement is reached at which time no more ink can be supplied to the pen. It is, however, during this interval that the movement of the diaphragm continues to supply ink to the pen permitting the supply to be independently replenished. To this end, a suitable pressure switch, which senses the drop from ink supply pressure to regulator output pressure, may be employed in conduit 20 to signal an operator that the ink supply is exhausted. Other suitable indicators sensing the diaphragm movement may also be used.

To replace the ink, one need simply disconnect the ink supply 16. The backflow of ink through the conduit 20 is prevented by the valve 18 which is closed with the disengaging of the ink supply 16 as is described, for example, in the said Peredy patent application. Thus, the supply of ink may be refilled or replaced while the recorder continues to operate without so much as a single skip or moment's lost time.

With the cessation of a particular recording, it is desirable to shut the system down without ink being drawn into any of the pens 58 or siphoning occurring between the pens, or for that matter, droplets of ink forming on the pen tips. All of this is prevented in accordance with this invention by the use of the clamp valve 56. With the system in operation, the air pressure from the pump 10, acting through conduits 14 and 80, respectively, expands the bellows 82, thereby opening clamp valve 86 and the tube 54 supplying ink to the pen 58.

When the system is to be shut down, the air pump 10 is turned off by the control unit 12 and the bellows allowed to collapse under the influence of spring 88. The clamp arm 86 closes the tube 54 thereby preventing ink from moving either out or into the tips of each of the pens 58. Existing ink pressure within the manifold 50 and the lines 48 is released or relieved, in accordance with this invention by the use of the stiffener plate 74. The stiffener plate 74 is placed on the ink side of the diaphragm such that the motion of the diaphragm 20 is "stiff" as seen in FIG. 2a when the ink pressure is lower than the air pressure, thus opening valve 34–36 and admitting more high pressure ink to the first chamber 30.

Conversely, when the air pressure is shut off and the ink pressure becomes higher than the air pressure, the diaphragm 28 is "soft." The ink pressure throughout the system now may cause a backwards flow into the first or ink chamber 30 and the excess volume caused thereby is relieved by bulging of the diaphragm 28 slightly into the second chamber 32 as seen in FIG. 2b.

Although not specifically described in detail, the control unit 12 in its simplest form may be no more than a group of power switches to supply line voltage to the several components of the system. In other forms of this invention, the control unit may be automatic to vary the air pressure as a function of chart paper speed. Any suitable system may be used.

There has been described an improved ink supply system which is relatively simple to build and economical to construct, and yet permits the relatively accurate control of ink pressures merely by the variation of pressure of fluid or air pressure. When the ink supply runs out of ink, the novel regulator of this invention can supply ink for a limited time by the movement of its regulating diaphragm alone. This facilitates the changing of the ink bottle without stopping the recorder and guarantees to the user that he has used all the ink while still allowing the completion of any test runs before replacement. Also when the system is shut off air is not permitted to enter the pen tip nor does the shutting off of the system tend to produce droplets of ink on the pen tip. Pressure in the system is released by the use of a stiffener plate in the diaphragm regulator and by the use of improved clamp operated by the air pressure available in the system.

Since many changes could be made in the above instructions and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a recording system of the type having a recording medium and an ink pen associated therewith for providing a visible trace on said recording medium, the combination of:
   ink reservoir means for storing a supply of ink under a predetermined substantially constant pressure,
   a source of substantially constant fluid pressure,
   a diaphragm housing,
   a flexible diaphragm supported by said housing and defining first and second chambers therein, said housing including means continuously affording communication respectively between said first chamber and said pen and between said second chamber and said source of fluid pressure,
   a valve seat member disposed in said housing and having a conduit therethrough,
   means including said valve seat member for affording communication between said ink reservoir means and said first chamber,
   a valve member supported by said diaphragm for cooperation with said valve seat member to control the passage of ink from said reservoir means to said first chamber in accordance with movement of said diaphragm, whereby ink is permitted to flow from said reservoir into said first chamber whenever the fluid pressure in said second chamber exceeds the ink pressure in said first chamber.

2. The combination set forth in claim 1 which also includes a pair of stiffener plates of different diameters attached to and abutting said diaphragm in said first and second chambers whereby the motion of said diaphragm is stiff when the ink pressure is less than the fluid pressure thereby to facilitate the operation of said valve member.

3. The combination set forth in claim 2 wherein said stiffener plates are arranged to permit flexing of the diaphragm into said second chamber and preventing it in said first chamber, thereby to facilitate lowering said fluid pressure, said diaphragm being designed to bulge slightly into said second chamber when the ink pressure exceeds said fluid pressure.

4. The combination set forth in claim 1 which also includes a normally closed fluid pressure operated valve located between said first chamber and said pen,
   said pressure operated valve having an operating means communicating with said fluid pressure means thereby to permit the passage of ink between said pen and said first chamber only in the presence of fluid pressure from said source.

5. The combination set forth in claim 2 which also includes a normally closed fluid pressure operated valve located between said first chamber and said pen,
   said pressure operated valve having a conduit means communicating with said fluid pressure means thereby to permit the passage of ink between said pen and said first chamber only in the presence of fluid pressure from said source.

6. The combination set forth in claim 5 which also includes pressure reducing means connected between said fluid pressure means and said second chamber, and wherein said source is connected to apply said fluid pressure to said ink in said reservoir, whereby the pressure of ink in said reservoir exceeds the fluid pressure in said second chamber, but the pressure of said second chamber controls the ink pressure applied to said pen.

7. The combination set forth in claim 2 which also includes pressure reducing means connected between said fluid pressure means and said second chamber, and wherein said source is connected to apply said fluid pressure to said ink in said reservoir, whereby the pressure of ink in said reservoir exceeds the fluid pressure in said second chamber, but the pressure of said second chamber controls the ink pressure applied to said pen.

8. The combination set forth in claim 2 which also includes:
a plurality of ink pens,
a manifold chamber having an input conduit in communication with said first chamber,
a plurality of flexible output conduits each in communication with a different one of said ink pens,
a plurality of pressure operated normally closed clamp means each adapted to close a different one of said output conduits, said source being in communication with all of said clamp means, whereby said conduits permit the passage of ink between said pens and said manifold chamber only in the presence of fluid pressure from said source.

9. The combination set forth in claim 8 which also includes pressure reducing means connected between said fluid pressure means and said second chamber, and wherein said source is connected to apply said fluid pressure to said ink in said reservoir, whereby the pressure of ink in said reservoir exceeds the fluid pressure in said second chamber, but the pressure of said second chamber controls the ink pressure applied to said pens.

10. The combination set forth in claim 9 which also includes drive means for said recording medium, and control means connected to said pressure means and said drive means for varying said fluid pressure and hence said ink pressure as a function of the speed of said recording medium.

11. The combination set forth in claim 2 wherein said means for affording communication between said ink reservoir means and said first chamber includes a normally closed valve which remains open only while the ink reservoir means is in communication with said first chamber, said communication means having a predetermined volume, thereby to provide an auxiliary ink supply which facilitates refilling or replacing the reservoir means without stopping the recorder while providing a continuous ink tracing on said recording medium.

References Cited
UNITED STATES PATENTS

| 2,874,019 | 2/1959 | Linsley et al. | 346—29 |
| 3,335,424 | 8/1967 | Hartai | 346—140 |
| 3,341,860 | 9/1967 | Schweitzer | 346—140 |

RICHARD B. WILKINSON, *Primary Examiner.*

JOSEPH W. HARTARY, *Assistant Examiner.*